United States Patent

Nabok

[11] Patent Number: 6,056,216
[45] Date of Patent: May 2, 2000

[54] METHOD OF SHREDDING WORN OUT TIRE CASINGS AND A DEVICE FOR APPLYING THE METHOD

[75] Inventor: Alexandr Andreevich Nabok, Moscow, Russian Federation

[73] Assignee: Obschestvo S Ogranichennoi Otvetstvennostju "Explotekh", Moscow, Russian Federation

[21] Appl. No.: 09/242,280
[22] PCT Filed: Aug. 8, 1995
[86] PCT No.: PCT/RU95/00163
  § 371 Date: Feb. 10, 1999
  § 102(e) Date: Feb. 10, 1999
[87] PCT Pub. No.: WO97/05995
  PCT Pub. Date: Feb. 20, 1997
[51] Int. Cl.[7] .................................................. B02C 19/12
[52] U.S. Cl. ................................. 241/1; 241/23; 241/65; 241/301; 241/DIG. 31
[58] Field of Search .................................. 241/23, 1, 301, 241/65, DIG. 31

[56] References Cited

FOREIGN PATENT DOCUMENTS

| | | |
|---|---|---|
| 2149739 | 3/1973 | France . |
| 3924145 | 1/1991 | Germany . |
| 633601 | 11/1978 | U.S.S.R. . |
| 1614843 | 12/1990 | U.S.S.R. . |
| 1752562 | 8/1992 | U.S.S.R. . |
| 2004978 | 12/1993 | U.S.S.R. . |
| 2196637 | 5/1988 | United Kingdom . |

*Primary Examiner*—Mark Rosenbaum
*Attorney, Agent, or Firm*—Hardaway/Mann IP Group

[57] ABSTRACT

The method for shredding wornout tire cases comprises exposing wornout tire cases to the effect of an explosion exerted thereon in a closed circular system so as to establish a directional circulating flow of explosion products. The device for carrying the method into effect comprises a chamber (1, 2) and a piping (3, 4) which forms, together with the chamber, a circular closed system, the chamber has a portion shaped as a cone-frustum shell (1), wherein shredding members (7) and a fixing unit of the explosive (13) are accommodated; a the smaller-diameter portion of the cone-shaped shell (1) communicates with one end of the piping (4) through a valve appearing as, e.g., a grid established by plates (7) in the area of the smaller base of the shell (1), while the other end of the piping (3) communicates with the chamber (1, 2) from the side of the larger-diameter portion of the cone-shaped shell (1).

13 Claims, 1 Drawing Sheet

METHOD OF SHREDDING WORN OUT TIRE CASINGS AND A DEVICE FOR APPLYING THE METHOD

TECHNICAL FIELD

The present invention relates in general to salvaging industrial and domestic wastes and more specifically to technology of processing wornout tire cases of automobiles or of other machinery, predominantly those with metal cord, as well as to devices for practical application of said technology.

BACKGROUND ART

At present salvaging wornout cases of auto- and tractor air-core tires with metal cord is a serious technical and ecological problem, because the existing technologies of their processing are uneconomic due to much material and power consumption.

One prior-art method for shredding wornout tire cases is known to use their mechanical shredding with the aid of a shredder unit having two shafts rotating against each other and carrying disks and toothed sleeves (SU, A1, 633,601).

However, said method suffers from high power consumption, involves use of sophisticated bulky equipment, and necessitates periodical outages of the technological process for replacing quickly wearing-out knife blades, especially when used for processing metal-cord cases.

One more method for shredding wornout metal-cord-reinforced tire cases is known to comprise cooling the cases down to the state of embrittlement, followed by their mechanical breaking and crushing, using a device having two disintegrators appearing as a die and a punch.

However, said method and disintegrator unit require also much power to be consumed, which is due to a necessity for producing and using a considerable amount of liquid nitrogen.

Known in the art presently is a method for destroying articles made from composites and rubber-like materials, in particular, wornout tire cases, said method comprising preconditioning the cases and their shredding by virtue of an explosion (SU, A1, 1,614,843). However, according to the method, the cases are shredded into large pieces and therefore need further disintegration, using other techniques. Moreover, the method suffers from low disintegration efficiency and low utilization efficiency of explosion energy.

A device for explosion destruction of wornout tire cases comprises a trough-shaped chamber, and a receptacle for shredded rubber, as well as a unit for fixing the explosive in place (SU, A1, 1,614,843).

However, said device fails to provide an efficient shredding of metal-cord-reinforced tire cases nor does it meet the requirements of safety engineering adopted in blasting operations.

DISCLOSURE OF THE INVENTION

The present invention has for its primary object to provide higher efficiency of shredding metal-cord-reinforced tire cases and lower power and material consumption.

The foregoing object is accomplished due to the fact in a method, comprising preconditioning tire cases and their shredding by means of explosion, according to the invention, an explosive action is exerted upon the tire cases in a closed circular system so as to establish a directional circulating annular flow of explosion energy and fragments of shredded tire cases.

According to a specific embodiment of the method, the fragments of tire cases are subjected to a repeated explosive action in a recirculated annular flow formed by the explosion product. According to other specific embodiments of the proposed method, the desired results is attained due to the fact that preconditioning metal-cord-reinforced tire cases for explosion-shredding involves their treating with high-frequency currents, or inductor-heating of the cord wire, or else cooling the tire cases.

The foregoing object is accomplished also due to the fact that a device for destructing and shredding wornout tire cases, comprising a chamber for their accommodating and an explosive fixing unit, according to the invention, is provided with shredding members and a piping which form, together with the chamber, a circular system, while the chamber has a portion shaped as a cone-frustum shell, wherein the shredding members and the explosive fixing units are accommodated; a smaller-diameter portion of the cone-shaped shell communicates with one piping end through a valve, while the other piping end is connected to the chamber from the side of larger-diameter portion of the cone-shaped shell.

According to other specific embodiments of the device, the shredding members on the cone-shaped shell appear as plates located in an axial plane thereof, said plates having cutouts that establish a space for accommodating the tire cases to be shredded; the valve appears as a grid located in the area of a smaller base of the cone-shaped shell; the piping is provided with grids for shredding the fragments of the tire cases; the chamber wall connecting the larger base of the cone-shaped shell to the piping appears as a cone-frustum shell, or as such a shell connected to a transition cylindrical wall; the piping elbow located on the side of the larger base of the cone-shaped shell is removable, while the stationary-fixed piping elbow has a product discharge hole. The chamber and the piping are isolated from the surrounding atmosphere by a protective housing, while the space between the housing and the chamber, as well as that between the housing and the piping are evacuated for sound-proofing of the device.

The essence of the proposed method and the device for carrying the method into effect consists in that the proposed combination of essential features makes it possible to realize the conditions under which in the first phase of explosion the tire cases are destructed into relatively large fragments, while in the second phase of explosion the large fragments are shredded, as a result of forming a directional flow of explosion energy many-times recirculating along the annular space, upon their colliding with the shredding members housed in the chamber and piping.

BRIEF DESCRIPTION OF THE DRAWINGS

In what follows the present invention will now be disclosed in a detailed description of an illustrative embodiment thereof with reference to the accompanying drawings, wherein.

BEST METHODS OF CARRYING OUT THE INVENTION

Figure 1:
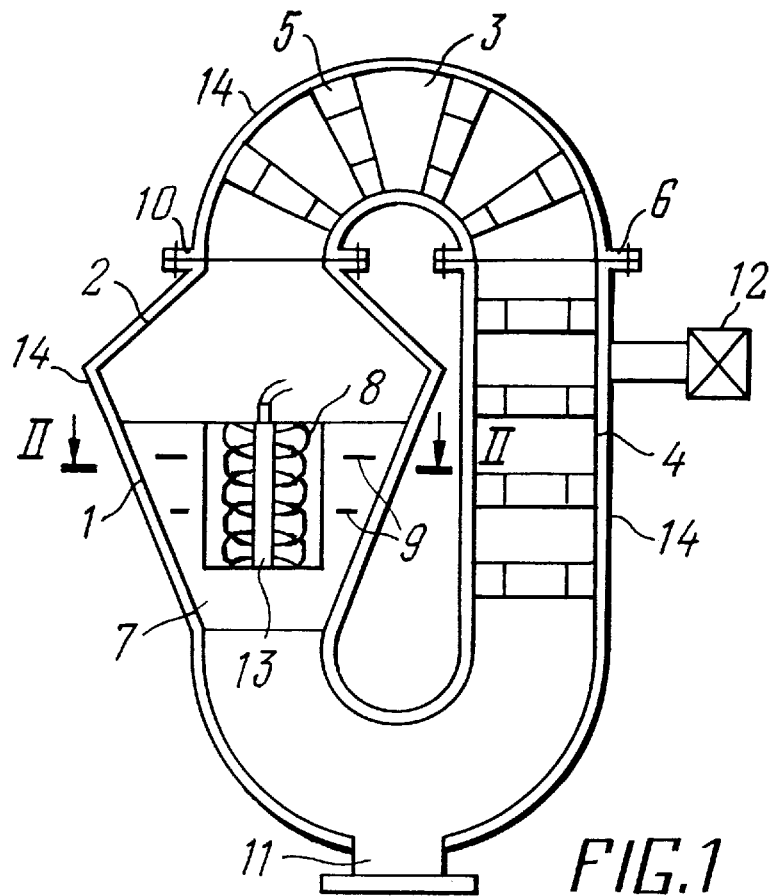
FIG. 1 is a general schematic view of the device for carrying the proposed method into effect.
Figure 2:
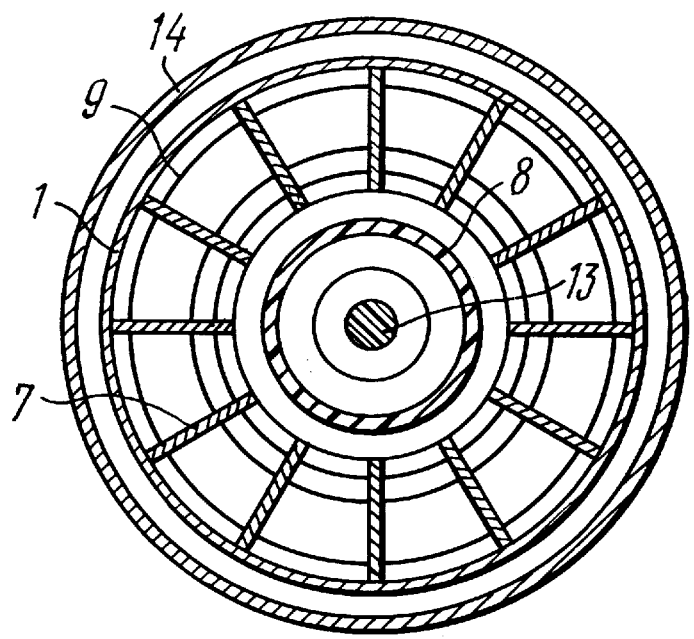
FIG. 2 is a cross-sectional view of the chamber of said device.

The device comprises an armored chamber, consisting of a cone-frustum shell 1 and a wall 2 and establishing, together with a piping 3, 4, a circular system. The piping comprises a detachable elbow 3 and an elbow 4 permanently joined to the chamber.

The piping accommodates grids 5, while the piping elbow 3 is connected to the piping elbow 4 via a joint 6. Welded to the shell 1 are plates 7 having cutouts in their upper portion which establish a space for tire cases 8 to accommodate. The chamber wall 2 is connected to the piping elbow 3 via a joint 10.

The piping elbow 4 has a hole 11 to discharge shredded fragments of tire cases, and a valve 12 for blowing the explosion chamber. An oblong explosive charge 13 is put in a pack of tire cases to be shredded. The chamber 1, 2 and the piping 3, 4 are enclosed in a housing, while the space between the housing and the device is evacuated for better soundproofing and heat insulation of the device. The amount of said space (gap) exceeds the linear displacements of the chamber and piping under the effect of an explosion.

The proposed method comprises also the operations of preconditioning the tire cases before shredding, which may include their washing, separating the bead-forming rings, compacting the tire cases, treating the metal cord with high-frequency currents or its heating in an inductor for decreasing the cord-to-rubber adhesion or cooling the tire cases so as to embrittle the rubber, and some other operations aimed at facilitating cord separation from rubber.

A pack of the preconditioned tire cases 8 is inserted in the chamber through an opening in the wall 2 resulting from removal of the piping elbow 3, and is placed in the space formed by the cutouts in the plates 7. Then the explosive charge 13 is put in the pack of tire cases, and a closed circular system is established by establishing communication between the piping elbow 4 and the opening in the wall 2, using the piping elbow 3 and the joints 6 and 10.

The device of the present invention operates as follows.

The explosive charge 13 is fired, with the result that in the first phase of explosion the tire cases 8 are displaced radially and get destroyed into large fragments under the action of the plates 7. In the second phase of explosion a directional flow of explosion energy and fragments of the destructed tire cases is established to circulate in the aforementioned closed circular space, this being due to the construction arrangement of the chamber. It is under the action of the grids 5, the plates 7, strips 9, and the walls of the chamber (1, 2) and of the piping (3, 4) that the fragments of tire cases undergo additional shredding and the explosion energy of the circulating flow is absorbed.

Once the explosion products have stopped circulating, the valve 12 is opened for the explosion chamber to blow down, whereupon the shredded fragments of the tire cases are discharged through the hole 11 and separated into rubber crumb and metal cord and fragments of bead-forming rings (if they have not been separated at the stage of preconditioning of the tire cases).

The resultant products of shredding of tire cases may be subjected to further disintegration either mechanically or by a repeated use of explosion energy according to the proposed method. In the latter case the fragments of tire cases are loaded in the armored chamber and are subjected to further disintegration in a circulating explosion flow. Reshredding of the fragments may be effected also without reloading the product.

Given below are some specific exemplary embodiments of the proposed method.

EXAMPLE 1

Size 6.45×13 metal-cord-reinforced tire cases are subjected to shredding. Once having been washed the tire cases are arranged in a pack (five items each) and are placed in the armored chamber. Then a cylinder-shaped explosive charge is inserted in the pack, said charge consisting of powdered ammonium nitrate (70%) and trinitrotoluene (30%) and having a total weight of 1 kg.

The charge is fired from type ЭД-8 electric fuze. A maximum size of fragments resulting from explosion-shredding of tire cases by the method disclosed herein is not in excess of 50 mm, and the amount of fractions sizing less than 20 mm is about 25% of a total weight of rubber and metal cord. A maximum size of fragments of the destructed bead-forming rings is 50 mm.

EXAMPLE 2

The fragments of tire cases resulting from Example 1 and having the size of from 20 to 50 mm is subjected to further shredding. The explosion procedure is carried out in a way similar to Example 1. A maximum size of the fragments of tire cases resulting from the second shredding procedure is not in excess of 20 mm. Then the resultant product is mechanically disintegrated and rubber crumb is separated from metal cord.

EXAMPLE 3

Size 6.45×13 metal-cord-reinforced tire cases are preconditioned for further shredding by being treated with high-frequency currents for reducing adhesion of cord wire to rubber. The product having the following composition is obtained as a result of explosion shredding as described in Example 1: maximum size of tire case fragments, 50 mm; amount of fractions sizing less than 20 mm, 35 wt. %; proportion of metal cord completely separated from rubber, about 70%.

EXAMPLE 4

Metal-cord-reinforced tire cases are preconditioned for further shredding by being cooled with liquid nitrogen and then are explosion-shredded as in Example 1. The resultant fragments have a maximum size of 10 mm and the amount of rubber crumb sizing less than 3 mm is 50 wt. %.

EXAMPLE 5

After having been preconditioned the tire cases as in Example 1, they are heat-treated in an inductor so as to reduce metal-cord-to-rubber adhesion. Then the tire cases are explosion-shredded as in Example 1 to obtain the product featuring a maximum size of tire case fragments not exceeding 50 mm and the amount of fractions sizing less than 20 mm, 30 to 35%, while the proportion of metal cord separated from rubber is about 70%.

Industrial Applicability

The method and the device for carrying said method into effect are instrumental in attaining higher efficiency of an effect of explosion so as not only to destruct a tire case but also to shred the resultant fragments thereof. Practical use of the method involves the use of but simple equipment, and the preparation procedure for explosion operations consists of simple operations. Application of the technological process according to the proposed method curtails substantially the amount of consumed power and the costs of destruction and shredding of tire cases.

Experimental check of the method and testing the device for its realization give evidence that the technological process for shredding tire cases may be realized with a strict adherence to the most stringent requirements imposed on safety engineering adopted in blasting operations and on ecological safety.

The proposed method and device for shredding wornout tire cases can find widespread industrial application at salvage processing enterprises, including those located at places for storage of wornout tire cases.

What is claimed is:

1. A method for shredding used tire cases comprising:

placing said tire casings in an explosion-proof chamber having a closed circular flow system; and detonating an explosive charge among said tire casings to generate a circulating annular flow of explosion products within said chamber.

2. A method according to claim 1 further comprising preconditioning said tire cases to reduce their strength.

3. A method as set forth in claim 2, CHARACTERIZED in that preconditioning tire cases involves their treating with high-frequency currents.

4. A method as set forth in claim 2, CHARACTERIZED in that preconditioning tire cases involves induction heating of metal cord with commercial-frequency currents.

5. A method according to claim 2 CHARACTERIZED in that preconditioning tire cases involves cooling.

6. A method as set forth in claim 1, CHARACTERIZED in that the fragments of tire cases are further shredded by a repeated explosive action.

7. A device for shredding wornout tire cases (8), comprising a chamber (1, 2) for their accommodating and a fixing unit of an explosive (13), CHARACTERIZED in that within the chamber are provided shredding members (7) and a piping (3, 4) which form, together with the chamber (1, 2), a circular system, while the chamber (1, 2) has a portion shaped as a cone-frustum shell (1), wherein the shredding members (7) and the fixing unit of the explosive (13) are accommodated; the smaller-diameter portion of the cone-shaped shell (1) communicates with one end of the piping (4) through a valve, while the other end of the piping (3) communicates with the chamber (1, 2) from the side of the larger-diameter portion of the cone-shaped shell (1).

8. A device as set forth in claim 7, CHARACTERIZED in that the shredding members (7) on the cone-shaped shell (1) appear as plates (7) located in an axial plane of the chamber (1, 2), said plates having cutouts that establish a space for accommodating the tire cases (8) to be shredded.

9. A device as set forth in claim 8, CHARACTERIZED in that the valve appears as a grid located in the area of a smaller base of the cone-shaped shell, and the grid is formed by the plates (7) secured on the shell (1).

10. A device as set forth in claim 6, CHARACTERIZED in that grids (5) are located in the piping (3,4).

11. A device as set forth in claim 6, CHARACTERIZED in that the wall of the chamber (2) connecting the larger base of the cone-shaped shell (1) to the piping (3, 4) appears as a cone-frustum shell (2), or as such a shell connected to a cylindrical pipe connector.

12. A device as set forth in claim 6, CHARACTERIZED in that the piping elbow (3) located on the side of the larger base of the cone-shaped shell (1) is removable, while the stationary-fixed elbow (4) of the piping (3, 4) has a product discharge hole (11).

13. A device as set forth in claim 6, CHARACTERIZED in that the chamber (1, 2) and the piping (3, 4) are enclosed in a housing (14), and the space (gap) between the housing (14) and the chamber (1, 2), as well as that between the housing (14) and the piping (3, 4) are evacuated, while the amount of said space (gap) exceeds the linear displacements of the chamber (1, 2) and of the piping (3, 4) under the effect of an explosion.

* * * * *